United States Patent
Kanazawa

(10) Patent No.: US 7,586,447 B2
(45) Date of Patent: Sep. 8, 2009

(54) WIRELESS DEVICE, ANTENNA SWITCH, AND METHOD OF RECEIVING SIGNAL

(75) Inventor: Masaru Kanazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 11/641,026

(22) Filed: Dec. 19, 2006

(65) Prior Publication Data

US 2008/0032756 A1    Feb. 7, 2008

(30) Foreign Application Priority Data

Aug. 7, 2006    (JP) .............................. 2006-214804

(51) Int. Cl.
 *H01Q 1/24*    (2006.01)
(52) U.S. Cl. ..................... 343/702; 343/876; 455/575.3
(58) Field of Classification Search ................. 343/702, 343/876, 756, 766; 455/575.3
 See application file for complete search history.

(56) References Cited

U.S. PATENT DOCUMENTS 5,374,937 A * 12/1994 Tsunekawa et al. ......... 343/702

| | | | |
|---|---|---|---|
| 2002/0000941 A1 * | 1/2002 | Johnson | 343/702 |
| 2002/0109635 A1 * | 8/2002 | Geeraert | 343/702 |
| 2005/0012669 A1 * | 1/2005 | Ide | 343/702 |
| 2005/0243000 A1 * | 11/2005 | Hwang et al. | 343/702 |

FOREIGN PATENT DOCUMENTS

| | | |
|---|---|---|
| JP | 11-186947 | 7/1999 |
| JP | 2000243926 | 9/2000 |
| JP | 2005-286854 | 10/2005 |

\* cited by examiner

*Primary Examiner*—Tho G Phan
(74) *Attorney, Agent, or Firm*—Fujitsu Patent Center

(57) ABSTRACT

A flip-open type mobile wireless device able to receive a signal of the same polarized wave both in an open state and a closed state of a movable part including an antenna with respect to a fixed part, provided in the antenna with a first feeding point and a second feeding point for handling different polarized waves, an open/close detecting unit for detecting which of the opened/closed states the movable part is in relative to the fixed part, and a feed switching unit for feeding electric power to the first feeding point when detecting the open state thereof and feeding electric power to the second feeding point when detecting the closed state thereof.

6 Claims, 6 Drawing Sheets

FIG.5A
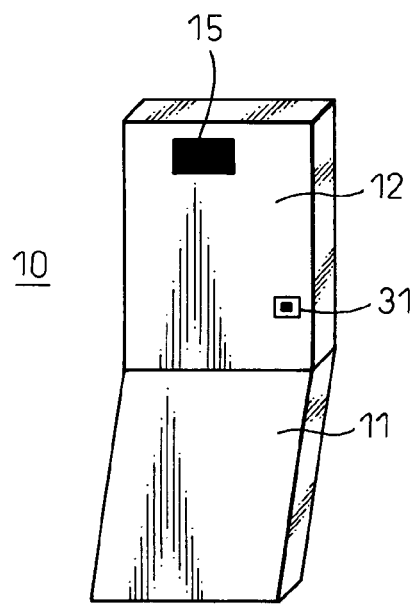
FIG.5B
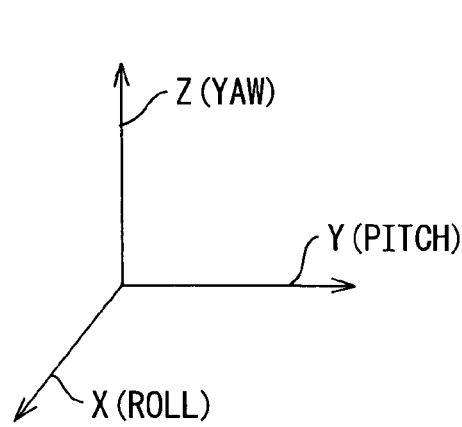
FIG.6
| AXIS | | Y-AXIS (PITCH) | |
|---|---|---|---|
| | | 0~179° | 180~359° |
| Z-AXIS (YAW) | 0~89° | F | R |
| | 90~179° | R | F |
| | 180~269° | R | F |
| | 270~359° | F | R |

FIG.7

| AXIS | | Y-AXIS (PITCH) | |
|---|---|---|---|
| | | 0~179° | 180~359° |
| Z-AXIS (YAW) | 0~89° | H | L |
| | 90~179° | L | H |
| | 180~269° | L | H |
| | 270~359° | H | L |

FIG.8

OPEN/CLOSE DETECTION LOGIC

| OPEN STATE | H |
|---|---|
| CLOSED STATE | L |

WIRELESS DEVICE, ANTENNA SWITCH, AND METHOD OF RECEIVING SIGNAL

BACKGROUND OF THE INVENTION

1. Field of the Invention

The present invention relates to a wireless device provided with an antenna, more particularly relates to a wireless device as a mobile wireless device where the orientation of the antenna is not fixed.

2. Description of the Related Art

As typical examples of mobile wireless devices where the orientation of the antenna is not fixed, there are mobile phones, notebook PCs, etc. In wireless devices such as these mobile phones and notebook PCs, in recent years, wireless devices have appeared which have to be able to send and receives signals carried on a plurality of polarized waves.

As examples, there are mobile phones provided with antennas for GPS and other wireless communications and notebook PCs able to connect to wireless local area networks (LAN). These mobile phones and notebook PCs have to mount circular polarized wave patch antennas and have to be able to send and receive two types of polarized waves, that is, a right hand circular polarized (RHCP) wave (first polarized wave) and a left hand circular polarized (LHCP) wave (second polarized wave). Note that, as relationships between the "first polarized wave" and the "second polarized wave" referred to here, other than that described above, there are a "linear polarized wave" and a "circular polarized wave". The following explanation will be given by taking as an example the circular polarized waves including the "right hand circular polarized wave" and the "left hand circular polarized wave". As the mobile wireless devices described above, an explanation will be given by taking as an example a mobile phone, particularly a GPS-capable mobile phone mounting a circular polarized wave patch antenna.

As the known art related to the present invention, there are Japanese Patent Publication (A) No. 2005-286854, Japanese Patent Publication (A) No. 1999-186947, and Japanese Patent Publication (A) No. 2000-243926. Japanese Patent Publication (A) No. 2005-286854 describes an antenna having a polarized wave switching function, Japanese Patent Publication (A) No. 1999-186947 describes a mobile communication terminal able to secure a transmission/reception sensitivity regardless of an opened/closed state of a cover including the antenna, and Japanese Patent Publication (A) No. 2000-243926 describes a patch antenna having one of a patch electrode or a ground plane emit a right hand circular polarized wave to the front and having the other emit a left hand circular polarized wave to the front.

Summarizing the problem to be solved by the invention, a GPS-capable mobile phone receiving a right hand circular polarized (RHCP) wave and a left hand circular polarized (LHCP) wave conventionally mounted a patch antenna optimizing the reception sensitivity for just one of these, for example, RHCP.

However, in recent years, so-called flip-open type mobile phones configured by a fixed part and a movable part which can be opened/closed with respect to this fixed part have begun to be widely used. The circular polarized wave patch antenna is mounted on the movable part side (the side having an LCD display surface). There is therefore the problem that when designed so as to optimize the reception sensitivity in the open state, the reception sensitivity deteriorated in the closed state (or vice versa). Particularly, in GPS-capable mobile phones, it is important to enable the reception of GPS signals and enable constant transmission of current location information not only at the time of usual use (above open state), but also at the time of nonuse (closed state described above).

SUMMARY OF THE INVENTION

In consideration of the above problems, an object of the present invention is to provide for example a flip-open type mobile wireless device able to optimize the reception sensitivity both for the open state and closed state described above. Further, another object is to provide an antenna switch and a method of receiving a signal.

To attain the above object, a device of the present invention is configured as follows. Namely, a first feeding point (F1) and a second feeding point (F2) for handling different polarized waves are formed. On the other hand, the device is provided with an open/close detecting unit (24) for detecting which of the opened/closed states the movable part (12) is in relative to the fixed part (11) and provided with a feed switching unit (23) for feeding electric power to the first feeding point (F1) when detecting the open state thereof and feeding electric power to the second feeding point (F2) when detecting the closed state thereof.

BRIEF DESCRIPTION OF THE DRAWINGS

These and other objects and features of the present invention will be more apparent from the following description of the preferred embodiments given with reference to the accompanying drawings, wherein:

FIGS. 5A and 5B are diagrams for explaining arrangements of an attitude angle sensing unit in a mobile phone;

FIG. 6 is a diagram showing a relationship between Z-Y axes and polarization control;

FIG. 7 is a table converting the F/R relationship of FIG. 6 to output signals (H/L) for a logical combination unit;

FIG. 8 is a table showing a detection logic of the opened/closed state;

DESCRIPTION OF THE PREFERRED EMBODIMENTS

Preferred embodiments of the present invention will be described in detail below while referring to the attached figures.

Figure 9:
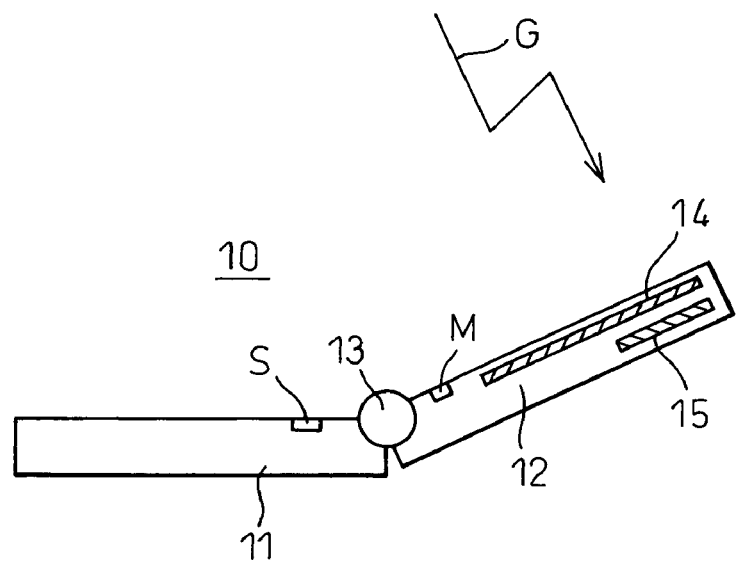
FIG. 9 is a cross-sectional view showing an "open state" of the mobile phone.
Figure 10:
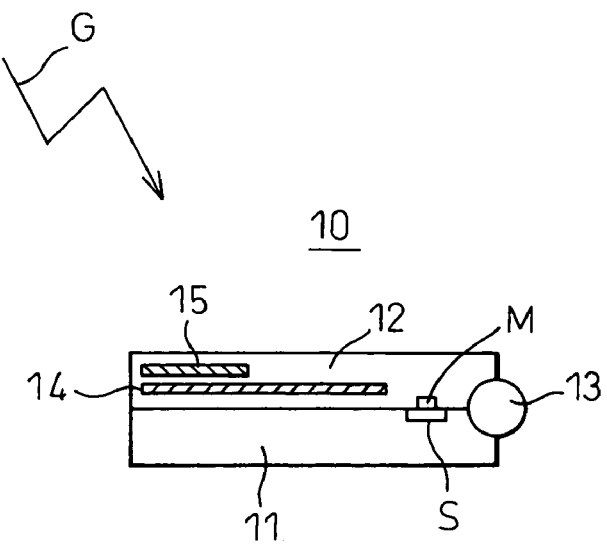
FIG. 10 is a cross-sectional view showing a "closed state" of the mobile phone.

FIG. 9 is a side view showing an "open state" of the mobile phone; and FIG. 10 is a side view showing a "closed state" of the mobile phone.

In FIG. 9, reference numeral 10 represents a housing of the mobile phone. As illustrated, this is configured by a fixed part 11 and a movable part 12 which can be opened/closed with respect to this. The two (11, 12) are pivotably connected by a hinge 13. Usually, a display (LCD display screen) 14 is built in a front side of the movable part 12, and a circular polarized wave patch antenna 15, the focus of the present invention, is built in a rear side thereof. This antenna 15 receives the GPS signal G from a satellite. The current location of the mobile phone is constantly calculated by a GPS processor (not shown).

On the other hand, referring to FIG. 10, in this "closed state", the movable part 12 inverts and becomes joined with the fixed part 11. Accordingly, the orientation of the antenna 15 relative to the GPS signal G also inverts.

Figure 11:
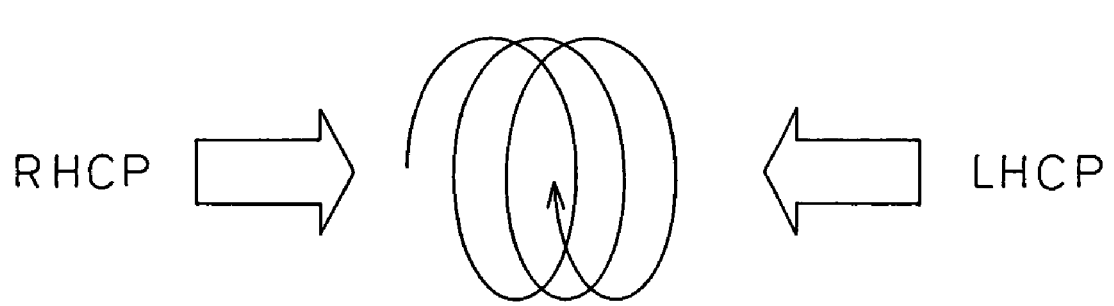
FIG. 11 is a diagram for explaining a direction of rotation of a circular polarized wave.

FIG. 11 shows the rotation direction of a circular polarized wave. As shown, depending on the direction from which the antenna 15 receives the GPS signal G carried on circular polarized wave, the circular polarized wave becomes a right hand circular polarized RHCP wave or a left hand circular polarized LHCP wave. Accordingly, when assuming that the antenna 10 receives an RHCP in the open state (FIG. 9), the antenna 15 receives an LHCP in the closed state (FIG. 10). For this reason, as already explained, when the antenna 15 is designed so as to be optimized for an RHCP in the open state, there arises a problem of deterioration of the reception sensitivity of the antenna 15 with respect to an LHCP in the closed state. The present invention solves this problem by proposing the mobile phone explained below.

Figure 1:
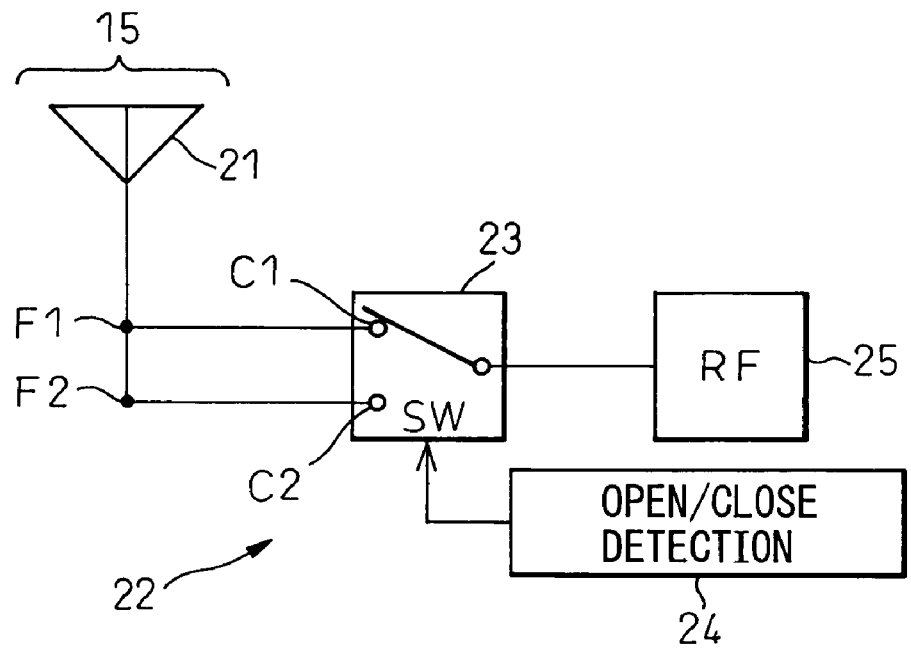
FIG. 1 is a diagram showing a first embodiment of a mobile phone according to the present invention.

FIG. 1 is a block diagram showing a first embodiment of a mobile phone according to the present invention. In the figure, reference numeral 21 is an antenna element of the antenna 15, and F1 and F2 are feeding points thereof. These feeding points F1 and F2 are connected to an antenna switch 22. This antenna switch 22 is configured by at least a feed switching unit 23 for connecting a radio frequency (RF) circuit 25 to either of the feeding point F1 or F2 and an open/close detecting unit 24 for detecting the opened/closed state of the movable part 12 relative to the fixed part 11 and selecting either of the feeding point F1 or F2 according to the detection result. For example, when the "open" state is detected as the above-described opened/closed state, the feed switching unit 23 selects the feeding point F1, while when the "closed" state is detected, the feed switching unit 23 selects the feeding point F2.

The present invention takes note of the fact that the optimum antenna characteristic can be obtained for each of different polarized waves by changing the location of the feeding point in the antenna 15. It detects the opened/closed state of the movable part 12 relative to the fixed part 11, automatically configures the antenna to handle one optimum polarized wave at the time of the open state, and automatically configures the antenna to handle the other optimum polarized wave at the time of the closed state so as to obtain the optimum antenna characteristic without being influenced by the opened/closed state of the wireless device.

Figure 2:
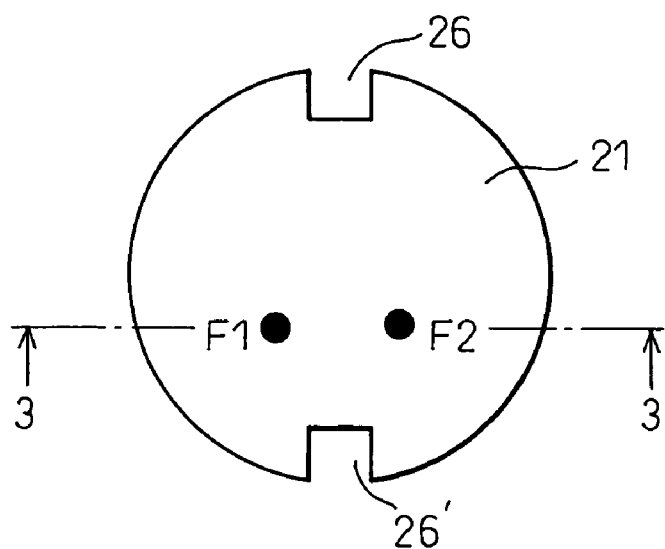
FIG. 2 is a plan view showing a concrete configuration of an antenna in FIG. 1.
Figure 3:
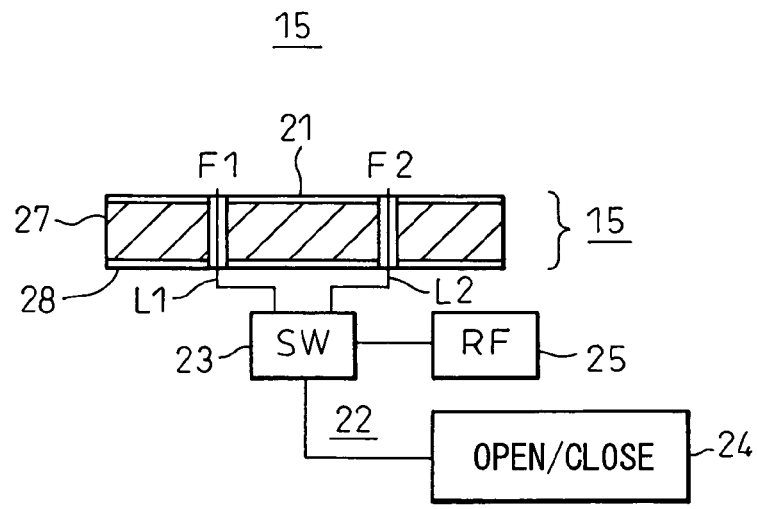
FIG. 3 is a cross-sectional view along an arrow 3-3 in FIG. 2.

First, an explanation will be given from the above mentioned feeding points F1 and F2. FIG. 2 is a plan view showing the concrete configuration of the antenna 15 in FIG. 1, while FIG. 3 is a cross-sectional view along an arrow 3-3 in FIG. 2. In FIG. 2, the shape of the antenna element 21 of the circular polarized wave patch antenna 15 is shown as a plan view. Note that this shows an example of the shape. This is a circular antenna element. Notches 26 and 26' are formed at parts of the circumferential edge thereof.

The shape of the antenna element 21, other than the above-described circular shape, may be square too. Projections may be provided other than the above-described notches. The important thing is to provide a plurality of feeding points in the antenna element 12, i.e., provide feeding points F1 and F2 in the example of the figure. For the arrangement of the feeding points F1 and F2, not only the arrangement positioning F2 on the right side of F1 (in the figure) as in the present figure, but also an arrangement positioning F2 above F1 (in the figure) can be employed.

On the other hand, referring to FIG. 3, the antenna element 21 is formed on the top surface of a dielectric 27 by for example a copper film. The bottom surface of this dielectric body 27 is formed with a ground (GND) 28 made of for example a copper film. Feeder lines L1 and L2 led out from the feeding points F1 and F2 are connected to contacts C1 and C2 of the feed switching unit 23 in the antenna switch 22 shown in FIG. 1. The open/close detecting unit 24 and RF circuit 25 linked with this feed switching unit 23 are as shown in FIG. 1.

In FIG. 2 and FIG. 3 described above, when power is fed from the feeding point F1, the circular polarized wave patch antenna 15 becomes the optimum for an RHCP (right hand circular polarized) wave, so the reception sensitivity becomes good. At this time, the movable part 12 of the housing 10 is in the open state relative to the fixed part 11 (see FIG. 9).

Here, when the movable part 12 is in the closed state relative to the fixed part 11 (see FIG. 10), the antenna 15 faces its back surface with respect to the GPS signal G. Therefore, this time it is necessary to optimize the antenna for an LHCP (left hand circular polarized) wave. Therefore, when detecting this closed state, the feed switching unit 23 is switched so as to feed power from the feeding point F2. As explained above, the fact that the characteristic of the antenna can be optimized for each of the different polarized waves by changing the location of the feeding point is generally known. Thus, it is possible to handle the polarized wave of the GPS signal G from a satellite etc. regardless of the opened/closed state of the housing 10 and possible to detect the position of the mobile phone by the optimal measurement state.

Summarizing the above, the wireless device according to the present invention is basically configured by (i) an antenna 15 having a first feeding point F1 configured for a first polarized wave and a second feeding point F2 configured for a second polarized wave, (ii) a housing 10 configured by a fixed part 11 and a movable part 12 able to be opened/closed relative to the fixed part 11 and accommodating the antenna 15, and (iii) a feed switching unit 23 for switching the feed of power to the first feeding point F1 or the second feeding point F2 in accordance with the opened/closed state. Further, it has (iv) an open/close detecting unit 24 for detecting the opened/closed state thereof and controlling switching at the feed switching unit 23.

This open/close detecting unit 24 is indispensable in a commercially available flip-open type mobile phone and can be formed by for example an MR sensor S and a magnet M shown in FIG. 9 and FIG. 10. In the open state, the magnet M is far away, so the MR sensor S becomes OFF, while in the closed state, the magnet M becomes close and the MR sensor S becomes ON.

Due to the ON or OFF operation of the MR sensor S, the contact of the feed switching unit 23 is switched to C2 or C1 and power is fed to F2 or F1, respectively. This feed switching unit 23 can be configured by a semiconductor switch or a mechanical switch. As a semiconductor switch, for example a switch IC such as a single pole double throw (SPDT) switch can be utilized, while as a mechanical switch, for example a relay contact can be used. No matter which switch is used, the ON/OFF state of the MR sensor explained before is applied to the switch as the ON/OFF state of an electric signal.

By the ON/OFF state of the electric signal, the contact C1 or C2 is selected and power is fed to the feeding point F1 or F2 via the feeder line L1 or L2. These feeder lines L1 and L2 (FIG. 3) can be formed on the dielectric 27 as strip lines.

Alternatively, connectors (male) may be mounted at ends of the feeding points F1 and F2 on the dielectric 27, and the feeder lines L1 and L2 may be formed by coaxial cables having other connectors (female) on their ends.

Figure 4:
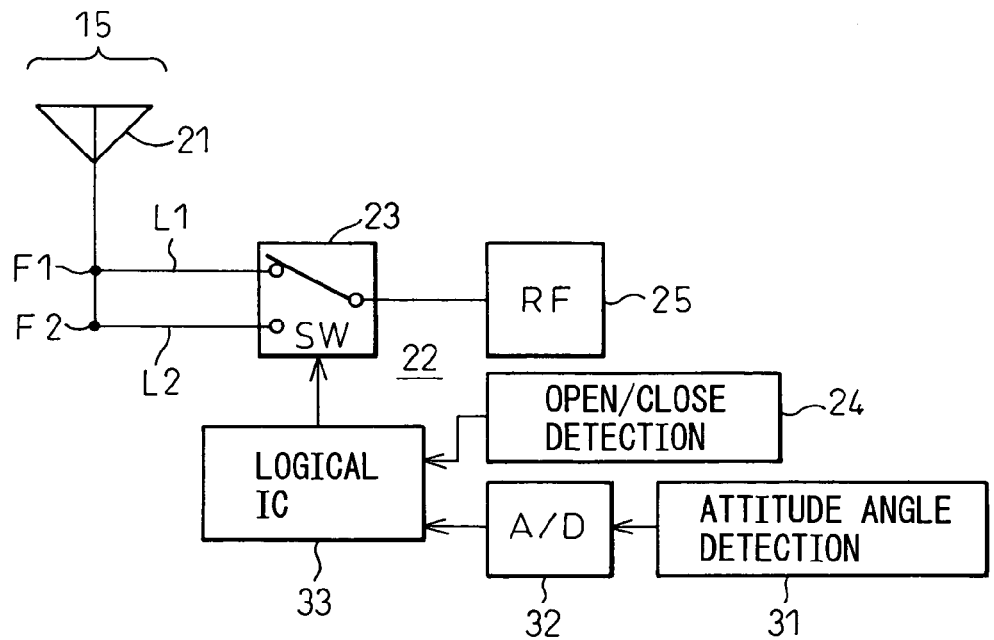
FIG. 4 is a diagram showing a second embodiment of a mobile phone according to the present invention.

FIG. 4 is a block diagram showing a second embodiment of a mobile phone according to the present invention. This second embodiment differs from the first embodiment (FIG. 1) explained before in the point that an attitude angle sensing unit 31 is further provided.

The wireless device according to the present invention mainly assumes a mobile device such as a mobile phone, therefore it is not limited to the case where the device is always held by the user in the direction shown in FIG. 9 or FIG. 10. It is estimated that the device may take a variety of angles relative to the GPS signal G depending on how it is held by the user. Therefore, the attitude angle sensing unit 31 is introduced. By further adding detected attitude angle information (31) other than the detected opened/closed state (24), the feed of the power at the feed switching unit 23 is switched. In FIG. 4, an attitude angle signal (analog) is converted to a digital signal via an A/D converter 32, then this is logically combined with the digital opened/closed state signal at the logical combination unit 33 (logical IC). This attitude angle sensing unit 31 will be explained below in a little more detail.

FIGS. 5A and 5B are diagrams for explaining the arrangement of the attitude angle sensing unit in the mobile phone. In FIG. 5A, as illustrated, the attitude angle sensing unit 31 is built in the same movable part 12 in which the antenna 15 is mounted. That is, the antenna 15 and the attitude angle sensing unit 31 are mounted on the movable part 12 so that they are always placed in the same coordinate system.

This coordinate system is shown in FIG. 5B. The coordinate system is defined by an X-axis, a Y-axis, and a Z-axis forming three dimensions and correspond to the roll, pitch, and yaw. The coordinate system of the angle shown in FIG. 5B is defined as 0°. Further, the clockwise direction toward the arrow directions of the X-axis, Y-axis, and Z-axis is defined as the forward direction.

FIG. 6 is a table showing the relationships between the Z-Y axes and polarization control. The figure shows the polarization set when the angle at the Z-axis (yaw) of the housing 10 is 0 to 89°, 90 to 179°, 180 to 269°, or 270 to 359° and the angle at the Y-axis (pitch) is 0 to 179° or 180 to 359°. That is, the figure indicates whether emission of the signal G to the front side of the movable part 12 is required or emission of the signal G to the rear side (R) thereof is required. For example, when the housing 10 is located at 180 to 269° in the Z-axis direction and located at 0 to 179° in the Y-axis direction, the emission of the signal G (LHCP) from the rear side (R) thereof is required. Note that depending on which of the open and closed states the housing is in, the selection of the feeding point F1/F2 further becomes different. Note that the reason why the relationship with respect to the X-axis (roll) is not shown in FIG. 9 is that the angle around the X-axis (roll) of the housing 10 is irrelevant to the polarization control in the present invention.

FIG. 7 is a table converting the relationship of F/R of FIG. 6 to output signals for the logical combination unit. The A/D converter 32 of FIG. 4 converts the attitude angle signal (31) of the analog voltage to a digital signal. Further, a predetermined threshold value is set, and the output signal (H/L) of FIG. 7 is generated and input to the logical combination unit 33.

The logical combination unit 33 considers the already explained opened/closed state signal H/L shown in FIG. 8 with respect to either the H/L output signal shown in FIG. 7, then the feed switching unit 23 performs the selection and switching of the contacts (C1/C2). Regardless of the attitude angle, only the polarized wave becomes reverse between the open state and the closed state, therefore the logic (H/L) of the table of FIG. 7 is inverted or non-inverted in accordance with the opened/closed state.

Note that as the attitude angle detecting unit 31 explained above, a commercially available sensor can be utilized. As an example, it is possible to utilize the 3D omni-directional angle sensing function of a "Motion Control Sensor" made by Aichi Steel.

Summarizing the above, the wireless device according to the present invention further has the attitude angle sensing unit 31 for sensing the attitude of the housing 10, and the switching at the feed switching unit 23 is controlled based on the output of this attitude angle sensing unit and the output of the open/close detecting unit 24. Further, provision is made of the logical combination unit 33 receiving as input the output of the attitude angle sensing unit 31 and the output of the open/close detecting unit 24 as digital signals, logically combining the two, and controlling the switching at the feed switching unit 23 by the result.

Further, the above idea of the present invention can be grasped as an "antenna switch" and further can be grasped as a "method of receiving a signal". Namely, an antenna switch according to the present invention is an antenna switch provided in a wireless device provided with a fixed part 11 and a movable part 12 able to open/close relative to the fixed part 11 and accommodating an antenna 15 having a first feeding point F1 configured for a first polarized wave and a second feeding point F2 configured for a second polarized wave, further having (i) a feed switching unit 23 for switching feed to a first feeding point F1 or a second feeding point F2, (ii) an open/close detecting unit 24 for detecting the opened/closed state and controlling the switching at the feed switching unit 23, and (iii) an attitude angle sensing unit 31 for sensing the attitude of a housing 10, the switching at the feed switching unit 23 is controlled based on an output of the attitude angle sensing unit 31 and an output of the open/close detecting unit 24.

Further, a method of receiving a signal in a wireless device is comprised of at least a first step S1 to a third step S3, the first step S1 being a step of detecting an attitude angle of a wireless device, the second step S2 being a step of detecting an opened/closed state of a housing, and the third step S3 being a step of logically combining detection outputs of the attitude angle (31) and the opened/closed state (24) and switching feed to a first feeding point F1 or a second feeding point F2 based on the result.

As explained in detail above, the polarized wave of the patch antenna can be switched so as to match with opened/closed state of the housing and the 3D attitude of the housing. As a result, even when an antenna having a small volume and low gain is used, the signal can be received with a high efficiency and therefore the housing can be reduced in size.

While the invention has been described with reference to specific embodiments chosen for purpose of illustration, it should be apparent that numerous modifications could be made thereto by those skilled in the art without departing from the basic concept and scope of the invention.

I claim:

1. A wireless device comprising:
   an antenna having a first feeding point configured for a first polarized wave and a second feeding point configured for a second polarized wave,
   a housing configured by a fixed part and a movable part able to be opened/closed relative to the fixed part and accommodating the antenna, a feed switching unit to switch the feed of power to the first feeding point or the second feeding point in accordance with the opened/closed state, an open/close detecting unit to detect the opened/closed state thereof and controlling switching at the feed switching unit, and an attitude angle sensing unit to sense the attitude of the housing, wherein the switching at the feed switching unit is controlled based on the output of the attitude angle sensing unit and the output of the open/close detecting unit.

2. A wireless device as set forth in claim 1, further comprising:

a logical combination unit to receive as input the output of the attitude angle sensing unit and the output of the open/close detecting unit as digital signals, logically combining the two, and controlling the switching at the feed switching unit 23 by the result.

3. A wireless device as set forth in claim 1, wherein said feed switching unit is a semiconductor switch or a mechanical switch.

4. A wireless device as set forth in claim 1, wherein said antenna is a GPS circular polarized wave patch antenna, said first polarized wave is a right hand circular polarized wave, and said second polarized wave is a left hand circular polarized wave.

5. An antenna switch provided in a wireless device provided with a fixed part and a movable part able to open/close relative to the fixed part and accommodating an antenna having a first feeding point configured for a first polarized wave and a second feeding point configured for a second polarized wave, comprising:

a feed switching unit for switching feed to a first feeding point or a second feeding point, an open/close detecting unit for detecting the opened/closed state and controlling the switching at the feed switching unit, and an attitude angle sensing unit for sensing the attitude of a housing, the switching at the feed switching unit being controlled based on an output of the attitude angle sensing unit and an output of the open/close detecting unit.

6. A method of receiving a signal in a wireless device provided with at least a fixed part and a movable part able to open/close relative to the fixed part and accommodating an antenna having a first feeding point configured for a first polarized wave and a second feeding point configured for a second polarized wave, comprising:

detecting an attitude angle of a wireless device, detecting an opened/closed state of a housing, and logically combining detection outputs of the attitude angle and the opened/closed state and switching feed to the first feeding point or the second feeding point based on the result.

* * * * *